US007747530B2

(12) United States Patent
Meadow et al.

(10) Patent No.: US 7,747,530 B2

(45) Date of Patent: Jun. 29, 2010

(54) CHECK AUTHORIZATION SYSTEM AND METHOD

(76) Inventors: William D. Meadow, 7950 James Island Trail, Jacksonville, FL (US) 32256; Randall A. Gordie, Jr., 13810 Sutton Park Dr. North, #518, Jacksonville, FL (US) 32224; Sanjay P. Ahuja, 505 S. Mill View Way, Ponte Vedra Beach, FL (US) 32082

( * ) Notice: Subject to any disclaimer, the term of this patent is extended or adjusted under 35 U.S.C. 154(b) by 0 days.

(21) Appl. No.: 12/208,701

(22) Filed: Sep. 11, 2008

(65) Prior Publication Data

US 2009/0010427 A1 Jan. 8, 2009

Related U.S. Application Data

(62) Division of application No. 09/901,124, filed on Jul. 10, 2001.

(51) Int. Cl.
*G06Q 20/00* (2006.01)

(52) U.S. Cl. ............................ 705/45; 705/39; 705/40; 705/44; 705/64; 705/72; 705/76; 235/375; 380/22; 380/51; 380/54

(58) Field of Classification Search .................. 705/39, 705/40, 45, 44, 64, 72, 76; 380/22, 51, 54; 235/375

See application file for complete search history.

(56) References Cited

U.S. PATENT DOCUMENTS 5,341,428 A 8/1994 Schatz
5,677,955 A 10/1997 Doggett et al.
6,170,744 B1 1/2001 Lee et al.

(Continued)

FOREIGN PATENT DOCUMENTS

WO WO 03-007526 A2 1/2003

OTHER PUBLICATIONS

A system for automatic extraction of the user-entered data from bankchecks, Koerich, A; Lee Luan Ling; Computer Graphics, Image Processing, and Vision, 1998. Proceedings. SIBGRAPI '98. International Symposium on Oct. 20-23, 1998 pp. 270-277.

(Continued)

*Primary Examiner*—Nga B. Nguyen
(74) *Attorney, Agent, or Firm*—Sterne, Kessler, Goldstein and Fox P.L.L.C.

(57) ABSTRACT

A device is provided that includes a monetary instrument having a surface, and a magnetic ink character recognition (MICR) line coupled to that surface. The MICR line includes an ABA number, a customer account number, and a one-way hash value. The one-way hash value is output from a hashing process using input including the ABA number, the customer account number, together with a personal identification code and a key that are not included on the MICR line. A method is also provided that authenticates a monetary instrument by comparing a computed one-way hash value with a one-way hash value that is located in the MICR line of the monetary instrument. At the point-of-sale, the MICR line data is scanned and the personal identification code obtained from the customer. The scanned data and the personal identification code are transmitted to a check verifier that provides a check verification status.

25 Claims, 4 Drawing Sheets

U.S. PATENT DOCUMENTS

| | | | |
|---|---|---|---|
| 6,181,814 | B1 | 1/2001 | Carney |
| 6,212,504 | B1 | 4/2001 | Hayosh |
| 6,611,598 | B1 | 8/2003 | Hayosh |
| 7,006,632 | B2 | 2/2006 | Meadow et al. |
| 2002/0174074 | A1 | 11/2002 | Meadow et al. |

OTHER PUBLICATIONS

A microprocessor-based optical character recognition check reader, Chin, F.; Wu, F.; Document Analysis and Recognition, 1995., Proceedngs of the Third International Conference on vol. 2, Aug. 14-16, 1995 pp. 982-985 vol. 2.
Manufacturing the ERMA banking system: lessons from history, McKenney J.L; Fisher, A.W.; Annals of the History of Computing, IEEE, vol. 15, Issue 4, 1993 pp. 7-26.
http://www.webopedia.com/TERM/O/one-way_hash_function.html.
http://www.topssoft.com/Products/Add-Ons/DigSig.htm.
http://www.psipay.com/micr.htm.
"Standard 066: Standards and Specifications for MICR-Encoded", RULES, Online, (May 25, 2000) pp. 1-14.
FIPS 180-1 Secure Hash Standard, obtained from http://www.itl.nist.gov/fipspubs/fip 180-1.htm on Apr. 26, 2001, document dated Apr. 17, 1995, pp. 1-19.
Class CRC32, obtained from http://www.java.sun.com/j2se/1.3/docs/apiu/java/util/zip/CRC32.htm, on Apr. 26, 2001, pp. 1-3.
File Verification Using CRC, by M. Nelson (published in Dr. Dobb's Journal, May 1992), obtained from http://www.dogma.net/markn/articles/crcman/crcman.htm, on Apr. 26, 2001, pp. 1-14.
Announcing Draft Federal Information Processing Standard (FIPS) 46-3, Data Encryption Standard (DES), and Request for Comments (published in Federal Register on Jan. 15, 1999), obtained from http://www.csrc.ncsl.nist.gov/cryptval/des/fr990115.htm, on Apr. 26, 2001, pp. 1-11.
Data Encryption Standard (DES), Triple DES, and Skipjack Algorithm, obtained from http://www.csrc.ncsl.nist.gov/cryptval/des.htm, on Apr. 26, 2001, pp. 1-2.
International Search Report for Publication No. WO03007526, dated Feb. 5, 2004, 3 pgs.

CHECK AUTHORIZATION SYSTEM AND METHOD

RELATED APPLICATIONS

This application is a divisional of U.S. application Ser. No. 09/901,124, filed Jul. 10, 2001, which is incorporated by reference herein in its entirety.

U.S. application Ser. No. 09/901,124 is related to U.S. application Ser. No. 09/859,356, filed May 18, 2001, now U.S. Pat. No. 7,006,632, issued on Feb. 28, 2006, entitled "Check Authorization System and Method", by the same inventors as this application, all of which are incorporated herein in its entirety by reference.

BACKGROUND OF THE INVENTION

1. Field of the Invention

The invention relates generally to a check authorization system and method, and, more particularly, to a check authorization system and method that incorporates information on a MICR line of a check for check verification and validation purposes.

2. Description of the Related Art

Check authorization systems and methods are becoming more and more important, since check fraud amounts to billions of dollars lost per year by banks and retail establishments. One such check authorization system is described in U.S. Pat. No. 6,170,744, by Warren S. Lee and William Meadow, which is assigned to Payformance Corporation and which is incorporated in its entirety herein by reference. In the system and method described in U.S. Pat. No. 6,170,744, information is provided on a check by way of a bar code provided on the check, whereby that information is used to verify the check's authenticity.

Such a system requires that the bar code be placed on a portion of the check that is not reserved for other purposes.

SUMMARY OF THE INVENTION

The present invention is directed to a method of check verification that includes determining an n-digit one-way hash value from standard bank and account information as well as a personal identification code of a customer and a key. The method outputs the n-digit one-way hash value as part of the MICR line.

In one example, the n-digit one-way hash value on the MICR line is utilized at a point-of-sale (POS) location, or at any other location where the check is presented for payment or cashing (e.g., bank teller) or for payment of goods and/or services.

According to one aspect of the present invention, there is provided a device that includes a monetary instrument and a magnetic ink character recognition line. The monetary instrument has a surface. The magnetic ink character recognition (MICR) line is coupled to the surface of the monetary instrument. The MICR line includes an ABA number, a customer account number, and a one-way hash value. The one-way hash value is output from a one-way hashing process using input including the ABA number, the customer account number, a personal identification code that is not included on the MICR line, and a key that is not included on the MICR line According to one aspect of the present invention, there is provided a check origination location that provides check preparation information to a check printer. The check printer receives the check preparation information, which includes private data of a customer for whom the checks are to be issued, as well as a p-bit key. The check printer includes a processor that executes a hashing algorithm based on the check preparation information provided to it. From the hashing algorithm, a one-way n-bit hash is obtained. The one-way n-bit hash is printed onto a MICR line of each check to be printed by the check printer. The one-way n-bit hash on the MICR line is utilized at a point-of-sale location, in order to verify a validity of a check being presented for payment at the point-of-sale location.

According to another aspect of the invention, there is provided a check verification system, which includes a bank, and a check printer that prints checks based on information provided thereto, the information including a MICR line that includes an ABA number of a bank, a customer account number, a check number, and a one-way hash value. The check printer prints the information on the MICR line based on information provided from the bank, the information including an n-digit personal code and a p-bit key that are not to be printed on the check.

According to another aspect of the invention, there is provided a self-authenticating check, which includes a payor field, a payee field, a check amount field, and a MICR line. The MICR line includes an n-digit ABA number, an m-digit customer account number, a p-digit check number, and an r-digit one-way hash value. The r-digit one-way hash value is computed by a one-way hash algorithm that uses the ABA number, the customer account number, the check number, a c-digit personal identification code that is not included on the MICR line, and a w-bit key.

According to yet another aspect of the invention, there is provided a method for verifying a check, which includes scanning the check to obtain data from a MICR line of the check, the data including a one-way hash value. The method also includes obtaining customer-specific information that is not included on the check and also obtaining a p-bit key. The method further includes providing both the scanned data and the customer-specific information to a check verifier. The method still further includes computing, by the check verifier, a one-way hash value based on a specific hash algorithm, the customer-specific information, and the key. The method also includes determining, by the check verifier, if the computed one-way hash value is the same as the one-way hash value obtained from the MICR line.

BRIEF DESCRIPTION OF THE DRAWINGS

The foregoing advantages and features of the invention will become apparent upon reference to the following detailed description and the accompanying drawings, of which.

DETAILED DESCRIPTION OF THE PREFERRED EMBODIMENTS

Preferred embodiments of the invention will be described in detail below, with reference to the accompanying drawings.

The present invention provides a self-authenticating check authorization system and method, for use by retail establishments where payment by check is accepted. The present invention helps detect any fraudulent check transactions being made at retail establishments. This helps lessen the costs at the retail establishments, banks and/or check verification services associated with improperly validating fraudulent checks, whereby these improperly validated fraudulent checks would have to be covered by the retail establishments and/or by banks and/or check verification services that made the improper validation.

The present invention provides for processing each check submitted for validation, and provides for validation of the authenticity of each check. In order to accomplish this, a one-way hash value is computed in order to obtain an enhanced level of security in order to counteract check fraud. The one-way hash value is written onto the MICR line of the check as an n-digit value, when the check is created by a check printing service. The one-way hash value is computed based on input data which includes: 1) customer-specific information, and 2) a key that has been encrypted by a bank or other provider of the key, whereby the key provides an additional level of authentication and fraud deterrence.

Figure 1:
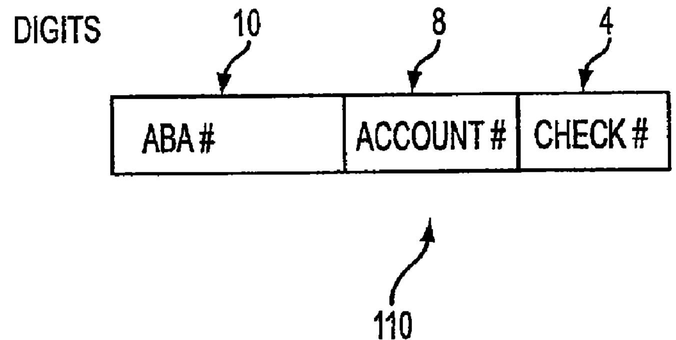
FIG. 1 is a diagram of a standard MICR line on a check.

FIG. 1 shows the format of a MICR line 110 on a standard check. The MICR line is used by banks for check clearance processing. The information provided on the MICR line and the positioning of that information on a check is based on well known specifications MICR specifications. See, for example, Standards for MICR Encoded Documents, Standard 006, obtained from www.cdnpay.ca/eng/rules/006.ENG2.htm#2.20.

For a personal check, the MICR line provides information corresponding to: 1) the ABA number of the bank at which the check is to be debited against (first ten digits on the MICR line), 2) the customer account number at the bank which is to be debited against (next eight digits on the MICR line), and 3) the check number (next four digits on the MICR line). The check number is an optional field on the MICR line 110, but is typically included on personal checks.

For business checks, there is provided an Auxiliary Onus Field, which is provided as the first field of the MICR line. The Auxiliary Onus Field typically includes the check number for a business check.

The MICR line has space for an additional 6 digits (more if the check number field is not utilized), whereby this space is currently not being utilized on most if not all conventional checks. The present invention makes use of this additional space on the MICR line in order to provide a hash value (preferably 6 digits, but may be of lesser size, such as three to five digits, and could possibly be of greater size if the MICR line would have the available space for it) to be used in check verification and validation.

In the present invention, each check presented for payment is uniquely identified by a 6-digit one-way hash value, which is computed using a hashing algorithm, such as a Cryptographic Hash Algorithm (CHA). The algorithmic techniques employed by the CHA are well known to those skilled in the art. Of course, other types of hashing algorithms may be utilized in order to provide a unique one-way hash value for each check, in accordance with the teachings of the present invention.

In the first embodiment of the invention, the one-way hash value is computed on raw data comprised of the ABA number, the 8-digit customer account number, a 4-digit check number (if included as part of the MICR line), a 4-digit personal customer information (hereinafter referred to as the private data), and a "key". The 4-digit personal customer information may be the last four digits of a checkholder's drivers license number or the last four digits of the checkholder's social security number, for example. Preferably, it is a sequence of digits that can be readily remembered by the customer. One of ordinary skill in the art will recognize that the personal customer information may be any number of digits.

For business checks, the information may be provided to the bearer of the check by an employee of the business, so that the bearer can then provide the private (to the business) information when the check is presented to a bank (or a POS) for payment.

In the second embodiment of the invention, the n-digit hash value is computed based also on a 1-digit product code, which is included on the MICR line in the second embodiment to provide additional information to the retail POS (or other entity that is being presented the check for payment or for cashing).

The MICR line information and the computed hash, but not the 4-digit private data of the customer or the key, is printed within the MICR line by a check printer which creates the checks. The bank where the customer has an account supplies the information needed to generate the hash value to the check printer. When a check created in this manner is presented for payment, this information is obtained at the retail POS by a MICR scanner that is used to scan the check at the retail POS. The customer provides the 4-digit private data at the retail POS, for example, by presenting his or her driver's license (or by verbally providing the private data) to a cashier (as explained above, for a business check, the checkholder is provided the private data from an employee of the business that has access to the private data). This information is keyed in at the checkout counter by the cashier (or by the customer, if a data entry pad for the customer is provided) and added to the MICR data scanned by the MICR scanner. This data is sent to a verifier/guarantor that verifies the validity of the check.

Figure 2A:
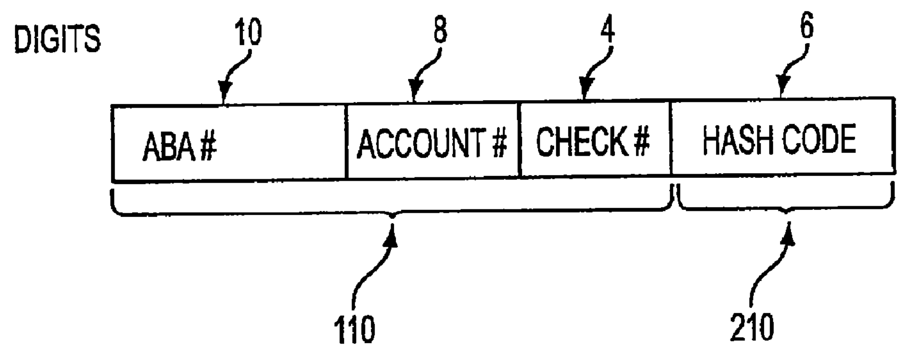
FIG. 2A is a diagram of a MICR line that includes a hash code and that is printed on a check according to a first embodiment of the invention.

FIG. 2A shows the format of a MICR line printed onto a check according to the first embodiment of the invention. Like the MICR line on a standard check, the MICR line printed onto a check according to the preferred embodiment of the invention has a 10-digit ABA number, a 8-digit customer account number, and an optional 4-digit check number (whereby all of this corresponds to the standard MICR line 110 as shown in FIG. 1). In addition, the MICR line on a check according to the first embodiment of the invention also includes a n-digit hash code, which is shown as a 6-digit hash code 210 in FIG. 2A.

Figure 2B:
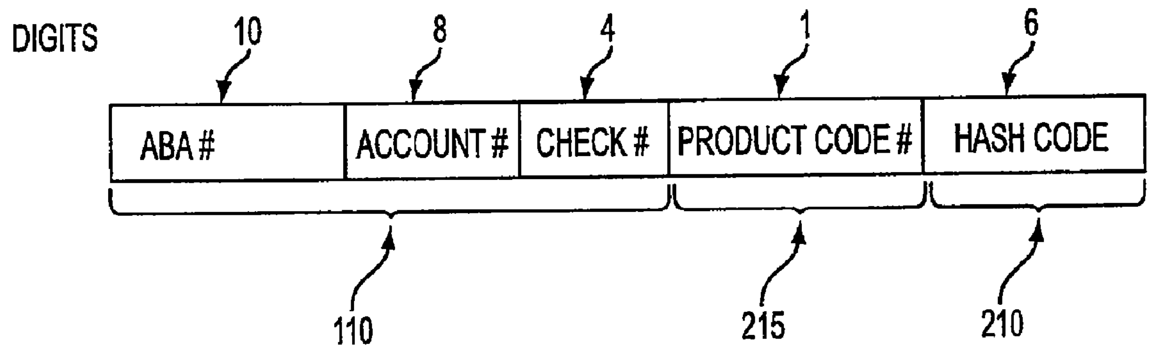
FIG. 2B is a diagram of a MICR line that includes a hash code and a product code that are printed on a check according to a second embodiment of the invention.

FIG. 2B shows the format of a MICR line printed onto a check according to the second embodiment of the invention. Like the MICR line on a standard check, the MICR line printed onto a check according to the preferred embodiment of the invention has a 10-digit ABA number, a 8-digit customer account number, and an optional 4-digit check number (whereby all of this corresponds to the standard MICR line 110 as shown in FIG. 1). In addition, the MICR line on a check according to the second embodiment of the invention also includes a product code 215 and an n-digit hash code 210. The product code 215 is shown as a 1-digit field, but it may be of a larger size to hold more check-related information, if so desired.

Figure 3:
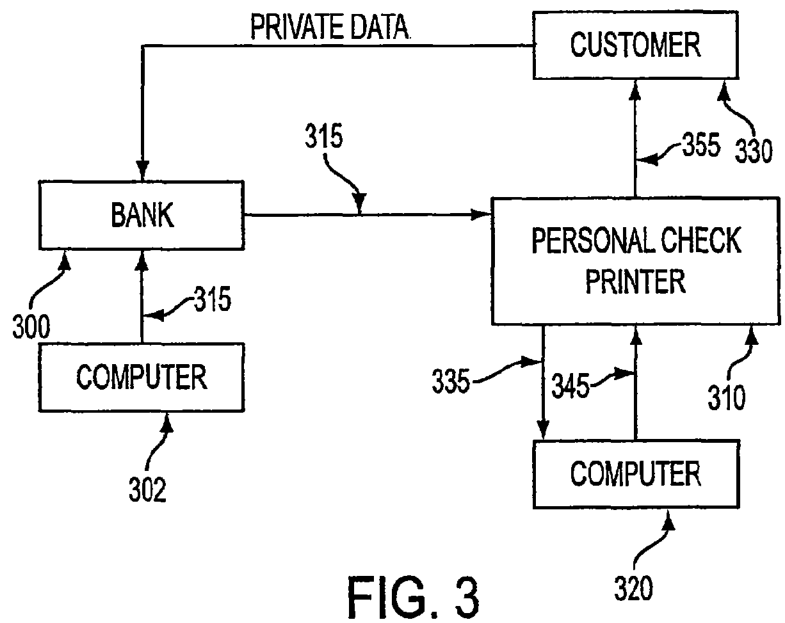
FIG. 3 is a block diagram of the elements utilized in creating a check that has check verification information printed thereon, according to either the first or second embodiments of the invention.

FIG. 3 is a block diagram illustrating the process of creating a check according to the first and second embodiments of the invention, from the perspective of a personal check printer. FIG. 3 shows a computer 302, a bank 300, a personal check printer 310, a computer 320, and a customer 330. As a first step, the computer 302 generates a key, which is preferably a Paybond™ key (to be described in more detail below), and provides that key to the bank 300 via communications path 304 (e.g., via mail, via the Internet, via a telephone connection, via a Wide Area Network or WAN). The Paybond™ key is generated at the computer 302 by an encryption algorithm, such as by a Triple Data Encryption Standard (3DES) algorithm or some other suitable encryption algorithm. The 3DES Algorithm is known to those skilled in the art, and is described, for example, in "Announcing Draft Federal Information Processing Standard (FIPS) 46-3, Data Encryption Standard (DES), and Request for Comments" published by the National Institute of Standards and Technology (NIST), as obtained from the Internet.

In a second step, the bank 300 orders checks from the check printer 310, via communications path 315. The bank 300 sends to the check printer 310 the information to be printed on the MICR line of each check to be printed, which includes the 10-digit ABA number, the 8-digit customer account number, and the starting check number (used to print a 4-digit check number for each check to be printed, in consecutive order). Additionally, product code data is provided to the check printer 310 in the second embodiment. The bank 300 also sends to the check printer 310 the private data of the customer 330 and the Paybond™ key (as obtained from the computer 302), as well as check style information (e.g., use italics or old English script for printed matter on the check, and use a "waterfalls" background for the check).

The private data of the customer 330 has been previously provided by the customer 330 to the bank 300, such as when the customer 330 makes his/her request for an order of new checks and/or first opened an account at the bank 300. As discussed above, the private data of the customer 330 may be the last four digits of the customer's social security number, or any other code that can be easily remembered by the customer 330 (e.g. lucky number, home street address number). For a business check, the private data is data that is "private' to the business, and is typically provided to the checkholder by an authorized employee of the business.

Upon receipt of this information from the bank 300, the check printer 310 forwards this information to the computer 320. The computer 320 executes a hashing algorithm, such as the CHA algorithm, based on the data passed to it from the check printer 310. The computer 320 may be a computer of the check printer 310, or may be a computer provided by a service or company separate from the check printer 310. The information is passed from the check printer 310 to the computer 320 over communications path 335 which may be an Internet connection, a modem-to-modem computer connection, mail delivery, etc.

The computer 320 generates a one-way hash value using a hashing algorithm and the raw data passed to it from the check printer 310. In the preferred embodiment, the computer 320 generates a 6-digit hash value from the raw data by way of the CHA algorithm. As described above, the raw data used in the first embodiment includes the ABA number, the customer account number, the check number, a hashed value of the Paybond™ key, and the private data of the customer 330. In the second embodiment, the raw data also includes the product code data.

A hash value is computed for each check to be printed (since the hash value will most likely change from check to check due to a different check number utilized on each separate check). The computed hash value for each check is sent to the check printer 310 by the computer 320, via communications path 345, which may be a method of communications similar to communications path 335, or may be a different mode of communications.

The check printer 310 prints checks for use by the customer 330, and provides a MICR line on each printed check, whereby the MICR line includes the ABA number, the customer account number, the check number, the product code (to be printed in the second embodiment not in the first embodiment), and the hash value. The printed checks are then preferably mailed from the check printer 310 to the customer 330, in the form of a checkbook, via communications path 355. Alternatively, the printed checks may be sent by the check printer 310 to the bank 300, and then from the bank to the customer 330, depending on the standard mode of operation for delivering checks to the customer 330.

An important aspect of the invention is the providing of a one-way hash value on each check that is used for check verification and authentication. One-way hashes are utilized in communication systems to prevent what can be thought of as the "digital cloning" of data. One-way hashing is a process whereby a unique fixed length hash value is mathematically generated from the original data of arbitrary length. One-way hashes mathematically ensure that the transformation that produced the unique hash value cannot be used in a reverse process. In addition, a small change in the raw data used to generate the hash results in a change in the hash value (which may be a substantial change, depending on the algorithm used and the numbers input to the algorithm), which can then be used to determine that a check presented for payment is or is not fraudulent.

Figure 4:
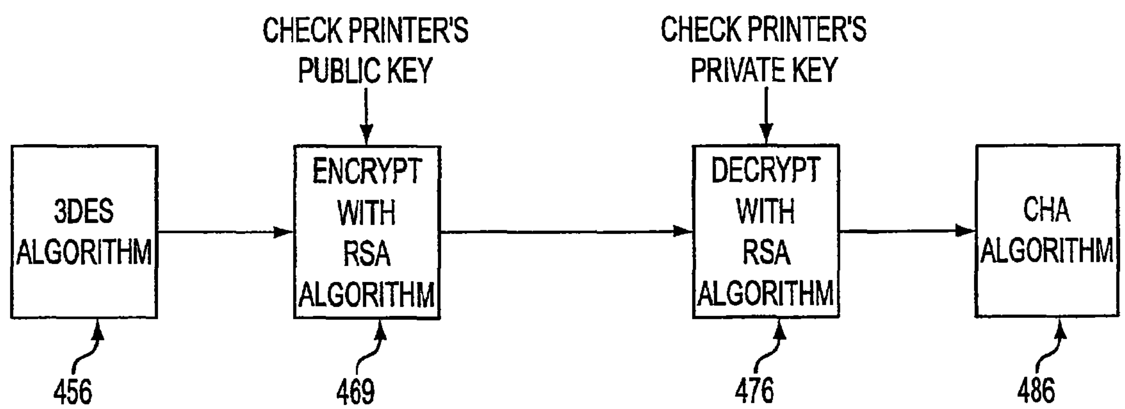
FIG. 4 shows the elements utilized in generating and transmitting a key to be used in the generation of a hash value, according to either the first or second embodiments of the invention.

FIG. 4 is a diagram that illustrates the generation and transmittance of the Paybond™ key from the computer 302 to the check printer 310 (by way of the bank 300). In a first step 456, a 128-bit key (the Paybond™ key) is generated by a symmetric encryption algorithm, such as 3DES. The generation of the Paybond™ key is done by the computer 302, which can be a computer owned and operated by the bank 300 or which can be a computer owned and operated by a service (e.g., Payformance Corporation) separate from the bank 300. Of course, those skilled in the art will recognize that different types of private keys may be utilized in the present invention, beyond the one described herein that utilizes 3DES.

The 128-bit symmetric key is transmitted between the bank 300 and the check printer 310 and between the bank 300 and a check verifier service provider 520 (see FIG. 6) in encrypted form by using a secure transmission procedure, such as by using the RSA Public/Private Key (PPK) algorithm or other type of secure transmission/reception scheme. Such a secure transmission/reception scheme is known to those skilled in the art.

A 1024-bit public/private key pair is generated for both the check printer 310 and the check verifier service provider 520 using the RSA PPK algorithm. If a different algorithm is used, the size of the key pair may be different than that given above.

The bank 300 retains the public key of both the check printer 300 and the check verifier service provider 520, while the corresponding private keys are made known only to the check printer 310 and the check verifier service provider 520, respectively.

The 128-bit symmetric key generated by the 3DES algorithm is encrypted using the public key of the check printer 310 and transmitted to the check printer 310. Also, the 128-bit symmetric key generated by the 3DES algorithm is encrypted using the public key of the check verifier service provider 520 and transmitted to the check verifier service provider 520. This encryption is shown by step 469 in FIG. 4.

In step 476, the check printer 310 (or the check verifier service provider 520) then decrypts the 128-bit symmetric key at its end using its private key (e.g., its RSA private key). No other entity can decrypt the 128-bit symmetric key because only the check printer 310 (or the check verifier service provider 520) has access to its private key. The 128-bit symmetric key serves as an input to the Cryptographic Hash Algorithm (CHA), which is shown as step 486 in FIG. 4.

Figure 5:
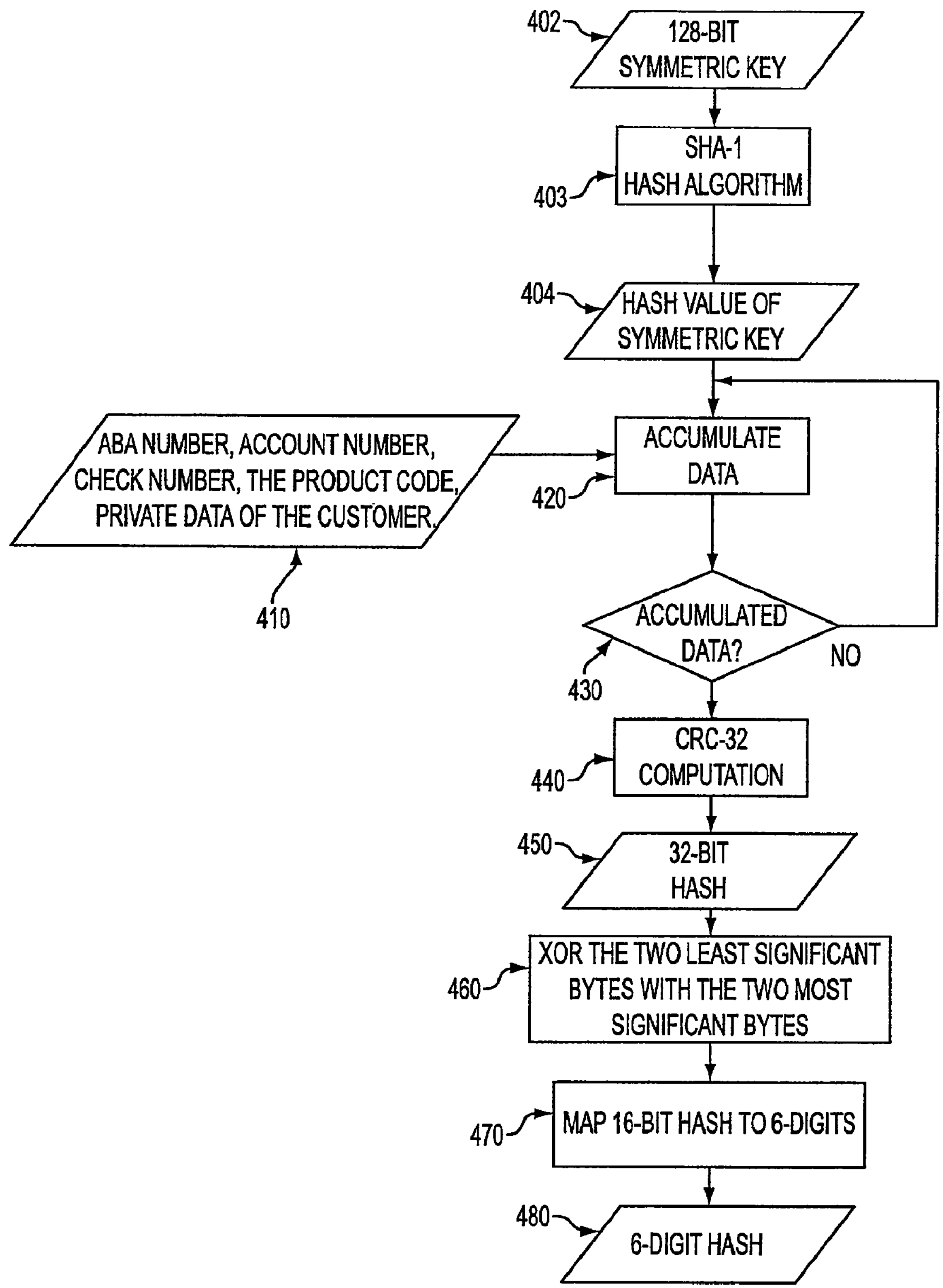
FIG. 5 is a flow chart describing the process for computing a hash value to be printed on each check, according to either the first or second embodiments of the invention.

FIG. 5 is a flow chart illustrating the actual computation of a one-way hash value by use of CHA. CHA is a well-known hashing algorithm, whereby public information on this hash algorithm may be obtained from the Internet, for example.

In step 402, the 128-bit symmetric key is input to CHA.

In step 403, a SHA-1 hash algorithm is performed on the 128-bit symmetric key. SHA-1 is well known to those skilled in the art, and is described, for example, in "Secure Hash Standard", dated Apr. 17, 1995, which is obtainable from the Internet. Of course, other types of hash algorithms besides SHA-1 may be performed, while remaining within the scope of the invention.

As a result of the SHA-1 algorithm performed on the 128-bit Paybond™ symmetric key, a 160-bit hash value is obtained in step 404.

In step 410, the ABA number, the customer account number, the check numbers to-be-printed (or just the starting check number and the total number of checks to be printed), and the private data of the customer (for a personal check, whereby private data of a business would be provided for a business check), are provided to the check printer 310 by the bank 300 in the first embodiment. For the second embodiment, the product code data is also provided to the check printer 310.

In step 420, the check printer 310 accumulates the data obtained from step 410 and the 160-bit hash value of the Paybond™ key obtained from step 404, so that the accumulated data will be subject to CHA. The data obtained from step 410 may be provided to the check printer 310 by an Internet connection, a WAN, or via the mail, for example. The raw data accumulated in step 420 is preferably stored in a byte array, in a memory (e.g., RAM), at the check printer 310, and is passed to the computer 320 for computing the hash value for the checks to be printed.

In a step 430, a determination is made as to whether or not all of the required data sent to computer 320 by the check printer 310 has been accumulated in byte form (or other type of digital form) by the computer 320. If no, the process returns to step 420, to wait for the remaining data. If yes, the process moves to step 440.

At step 440, an error check computation is performed, which is shown as a CRC-32 computation in FIG. 5. Such an error check computation is well known to those skilled in the art. In the present invention, other types of computations may be performed, other than the CRC-32 computation, to provide the requisite number of hash bits.

At step 450, as a result of the CRC-32 computation at step 440, a 32-bit hash value is generated. Of course, if a different error check computation is performed, a hash value having a different number of bits (e.g., 24 bits, 64 bits) may be obtained at step 450.

At step 460, the 32-bit hash value is decreased in size to obtain a 16-bit hash value. In the first and second embodiments, the two least significant bytes of the 32-bit hash value are exclusive-or'ed with the two most significant bytes of the 32-bit hash value, in order to obtain a 16-bit hash value. Other ways of decreasing the hash size may be contemplated, such as by exclusive-nor'ing the two least significant bytes and the two most significant bytes with each other, for example.

At step 470, the 16-bit hash value obtained as an output of step 460 is mapped to a 6-digit hash value, so as to be of a size that can be printed onto a MICR line of a check. The mapping for doing this may be by way of a table lookup procedure, such as by converting the 16-bit hash value to its decimal equivalent. For example, 1010111001010001 hash value may be mapped to 127121, by taking each triplet of bits, starting from the least significant bit and working up to the most significant bit, and mapping each triplet of bits to a decimal value. Other ways of mapping from 16-bits to 6-bits may be contemplated, while remaining within the scope of the invention as described herein. For example, the triplets may be started at the most significant bit, working down to the least significant bit (whereby the last-triplet of bits corresponds to the least significant bit only, as converted to a decimal value). In that case, the computed value would be 534501.

At step 480, a 6-digit hash value is obtained, which is provided to the check printer 310 by the computer 320, for printing on each check. The 6-digit hash value will be a unique, non-deterministic value for each check to be printed by the check printer 310, since the check number (if included on the MICR line) is different for each check.

Figure 6:
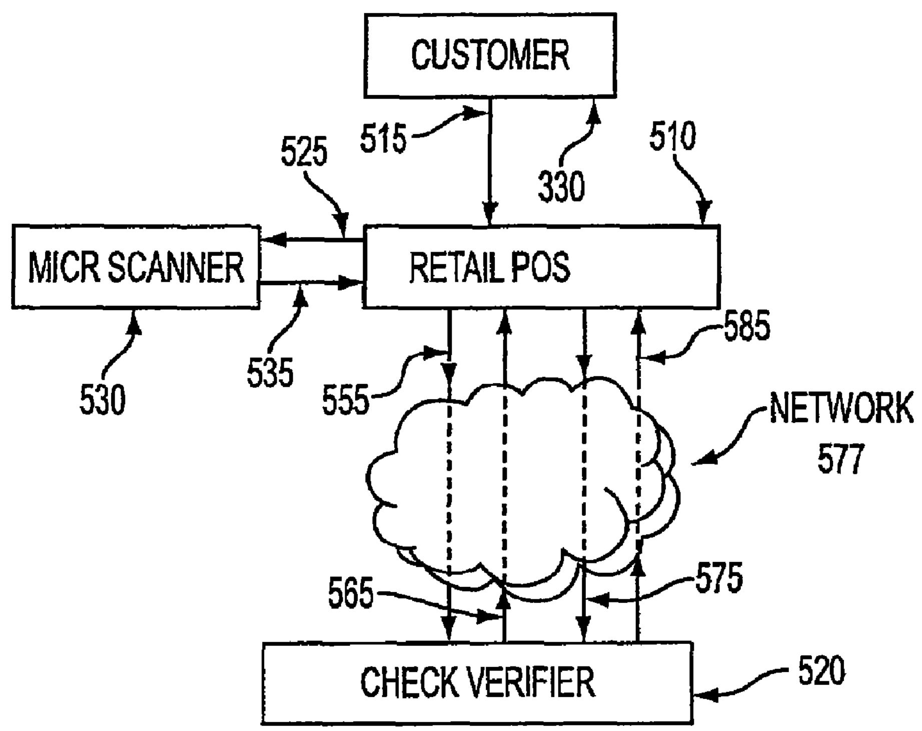
FIG. 6 is a block diagram of the entities involved in a check verification process, according to either the first or second embodiments of the invention.

FIG. 6 illustrates the elements involved in the interaction between the customer 330, the retail point of sale (POS) 510 (e.g., a retail store), and a check verifier service provider 520. Also shown in FIG. 6 is a MICR scanner 530, which is provided at the retail point of sale (POS) 510 (for scanning checks presented for payment). The check verifier service provider 520 may be any one of currently available check verifier service providers, or a new provider of such a service. For example, Telecheck™ currently provides such a service, and it could be utilized as part of the check verification service of the present invention, by making available to the check verifier service provider 520 information needed to compute a hash value and thereby to verify a check's authenticity.

The total process from check presentation to check validity (or check not valid determination) for the first and second embodiments of the invention will be described below in detail, with reference to FIG. 6.

The customer 330 presents a check to the retail POS 510, as shown by label 515. The presented check is scanned at the retail POS 510 by the MICR scanner 530, as shown by label 525. The scanned MICR line data is provided to the retail POS 510 from the MICR scanner 530 as shown by label 535.

For conventional checks, the scanned MICR line data will not include the hash code value that is printed on the MICR line of each check according to the preferred embodiment, and thus those checks will be treated in a conventional manner by the check verifier service provider 520. However, checks that include a hash value in the scanned MICR line data, as an extra field of data, will be treated differently by the check verifier service provider 520.

The scanned MICR line data is provided to the check verifier service provider 520 from the retail POS 510, as shown by label 555. This data may be transmitted over a Network 577, such as the Internet or a WAN, for example.

Upon receipt of the scanned MICR line data, and upon determination that the scanned MICR line data also includes a hash value as an additional field, the check verifier service provider 520 sends a request (over Network 577) back to the retail POS 510, whereby that request is for the private data of the customer 300 to be provided to it. This request is shown by label 565 in FIG. 6.

As the retail POS 510, a cashier and/or other employee at the retail 510 requests the private data from the customer 330, such as by requesting that the customer key in that data onto a data entry device at the retail POS 510 (or by having the customer 300 provide the private data to the cashier), and whereby the cashier enters that data for transmission to the check verifier service provider 520. The private data is provided to the check verifier service provider 520 over Network 577, as shown by label 575 in FIG. 6.

Upon receipt of the private data, the check verifier service provider 520 verifies the hash value, in order to determine if the computed hash value matches the hash value printed on the check presented by the customer 330 at the retail POS 510. A key value previously obtained by the check verifier service provider 520 (where that key value is assigned to the customer or account corresponding to the check presented for validation) is used in the computation of the hash value by the check verifier service provider 520. If the hash value is verified, the check verifier service provider 520 responds with a check approval notification to the retail POS 510, via Network 577.

In the second embodiment, a product code field is also included on the MICR line. The product code is a field of digits (e.g., 1 or 2 digit field, for example) that conveys more information on the check and the account on which the check is to be drawn against. For example, Product Code=0 signifies that the account in question is not sufficient funds (NSF) protected, Product Code=1 signifies that the check is authorized up to a maximum of $1,000, Product Code=2 signifies that the check is authorized up to a maximum of $10,000, and Product Code=4 signifies the type of data required (e.g., social security number, or driver's license number).

The providing of the check valid/not valid information and/or the (decoded) product code information is shown by way of communications path 585 in FIG. 6, which is sent over Network 577.

Figure 7:
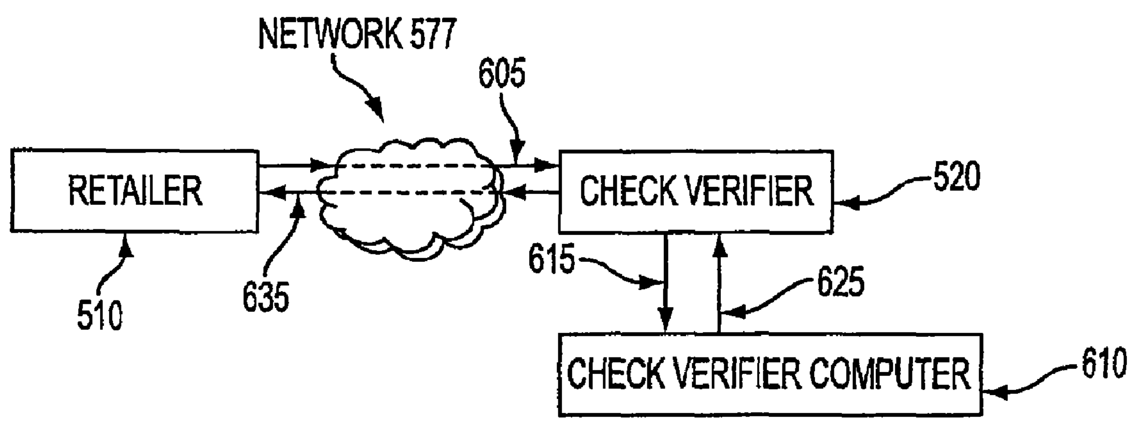
FIG. 7 is a block diagram of the elements utilized in a check verification process from the perspective of a check verifier service provider, according to either the first or second embodiments of the invention.

FIG. 7 illustrates the check verification process for the first and second embodiments of the invention from the perspective of the check verifier service provider 520.

The retail POS 510 transmits the data obtained from the scanned MICR line, which contains the raw data and the hash value generated by the check printer, to the check verifier service provider 520, as shown by communications path 605. This transmission of data is made over Network 577 (e.g., Internet, a WAN, etc.). The program that implements the CHA algorithm (or other type of hashing algorithm used) is preferably stored within an executable file (.EXE file) in a memory that is accessible by the check verifier's computer 610.

The raw data is passed to the check verifier's computer 610 from the check verifier service provider 520, as shown by communications path 615.

The check verifier's computer 610 uses the raw data comprising the ABA number, the customer account number, the check number (if included as part of the MICR line), the private data of the customer (or the private data of a business for a business check), and the PayBond™ key (which the check verifier service provider 520 has previously received from the bank 300). The check verifier service provider 520 generates the one-way hash value using this data and the executable code stored in its memory. It then compares the computed hash value with the hash value transmitted by the retail POS 510 (as included within the MICR line transmitted by the retail POS 510) to the check verifier service provider 520. If there is a match, the check is determined to be authentic. The status of the check is returned to the check verifier service provider 520, as shown by communications path 625.

The check verifier service provider 520 then returns the status of the check verification process along with the message appropriate to the product code to the retail POS 510, as shown by communications path 635. This passage of data is made over Network 577. As explained earlier, other information besides check valid/not-valid, such as a specific dollar cap for the check, whether the check is NSF or overdraft protected, etc., may be provided as well to the retail POS 510, based on the information in the product code field that is included on the MICR line in the second embodiment. Based on the information provided to it from the check verifier service provider 520, the retail POS 510 either accepts the check or rejects the check.

Thus, a system and method has been described according to several embodiments of the present invention. Many modifications and variations may be made to the techniques and structures described and illustrated herein without departing from the spirit and scope of the invention. Accordingly, it should be understood that the methods and apparatus described herein are illustrative only and are not limiting upon the scope of the invention. For example, the presentation of a check for payment may be made at a bank, for example, instead of a retail POS, while remaining within the spirit and scope of the invention.

Furthermore, the location of the hash code (and the product code in the second embodiment) on the MICR line may be different from that shown in FIGS. 2A and 2B. For example, the hash code would typically be provided on the right side of the MICR line (next to check number) for a personal check, and the hash code would typically be provided on the left side of the MICR line (next to ABA number) for a business check. This placement of the hash code on the MICR line is based on the current specifications for the MICR line, and may be changed to include other locations if the MICR line specifications are modified in the future.

Additionally, while the present invention has been described with respect to personal checks and business checks, it is also applicable to other modes of payment, such as traveler's checks, money orders, or cashier's checks.

What is claimed is:

1. A method comprising:

scanning, by a point-of-sale device, at a point-of-sale location, a monetary instrument associated with an account to obtain data from a MICR line of the monetary instrument, the data including a one-way hash value;

obtaining, by a point-of-sale device, at the point-of-sale location, a personal identification code that is not included on the monetary instrument;

transmitting, by a computing device, from the point-of-sale location to a monetary instrument verifier, the scanned data and the personal identification code; and receiving, by the computing device, from the monetary instrument verifier, a monetary instrument verification result.

2. The method of claim 1, wherein the one-way hash value of the monetary instrument is included in an n-digit field at one end of the MICR line.

3. The method of claim 1, wherein:

the data further includes a product code; and the receiving further includes receiving a maximum amount for the monetary instrument.

4. The method of claim 1, wherein:

the data further includes a product code; and the receiving further includes receiving an indication of NSF (not sufficient funds) protection for the account.

5. A method comprising:

determining, by a computing device, a one-way hash value using a one-way hashing process based on a key, a personal identification code, an ABA number, and a customer account number; and outputting, by a printing device, a magnetic ink character recognition (MICR) line on a monetary instrument, wherein the MICR line comprises the ABA number, the customer account number and the one-way hash value.

6. The method of claim 5, wherein the key is a 128-bit key.

7. The method of claim 5, wherein:

the determining of the one-way hash value is further based on a check number; and the MICR line further comprises a check number.

8. The method of claim 7, wherein the one-way hashing process uses a Cryptographic Hash Algorithm (CHA).

9. The method of claim 7, wherein the one-way hashing process outputs a significantly different one-way hash value in response to minor changes in its inputs.

10. The method of claim 7, wherein the determining of the one-way hash value is further based on a product code number.

11. The method of claim 7, wherein the one-way hash value is a 6-digit number.

12. The method of claim 7, further comprising, before using the key, decrypting an encrypted version of the key to generate the key.

13. The method of claim 12, wherein the decrypting uses a 3DES algorithm.

14. A method, comprising:

generating, by a computing device, a one-way hash value using a one-way hashing process based on a key, a personal identification code, an ABA number, and a customer account number associated with a monetary instrument; and comparing, by the computing device, a printed one-way hash value and the one-way hash value to determine an authenticity of the monetary instrument.

15. The method of claim 14, wherein the key is a 128-bit key.

16. The method of claim 14, wherein the generating of the one-way hash value is further based on a check number associated with the monetary instrument.

17. The method of claim 16, wherein the one-way hashing process uses a Cryptographic Hash Algorithm (CHA).

18. The method of claim 16, wherein the one-way hashing process outputs a significantly different one-way hash value in response to minor changes in its inputs.

19. The method of claim 16, wherein the generating of the one-way hash value is further based on a product code number associated with the monetary instrument.

20. The method of claim 16, wherein the one-way hash value is a 6-digit number.

21. The method of claim 16, further comprising, before using the key, decrypting an encrypted version of the key to generate the key.

22. The method of claim 21, wherein the decrypting uses a 3DES algorithm.

23. The method of claim 16, further comprising issuing a status message based on an output of the comparing.

24. A tangible computer-readable medium having stored thereon, computer-executable instructions that, if executed by a computing device, cause the computing device to perform a method comprising:

determining a one-way hash value using a one-way hashing process based on a key, a personal identification code, an ABA number, and a customer account number; and outputting a magnetic ink character recognition (MICR) line on a monetary instrument, wherein the MICR line comprises the ABA number, the customer account number and the one-way hash value.

25. A tangible computer-readable medium having stored thereon, computer-executable instructions that, if executed by a computing device, cause the computing device to perform a method comprising:

generating a one-way hash value using a one-way hashing process based on a key, a personal identification code, an ABA number, and a customer account number associated with a monetary instrument; and comparing a printed one-way hash value and the one-way hash value to determine an authenticity of the monetary instrument.

* * * * *

UNITED STATES PATENT AND TRADEMARK OFFICE

CERTIFICATE OF CORRECTION

PATENT NO. : 7,747,530 B2
APPLICATION NO. : 12/208701
DATED : June 29, 2010
INVENTOR(S) : Meadow et al.

It is certified that error appears in the above-identified patent and that said Letters Patent is hereby corrected as shown below:

Column 1, line 62: Replace "line" with --line.--

Column 4, line 4: Replace "techmques" with --techniques--

Column 10, line 50: Replace "MICR" with --magnetic ink character recognition (MICR)--

Signed and Sealed this
Fourth Day of October, 2011

David J. Kappos
*Director of the United States Patent and Trademark Office*